US008985697B2

(12) United States Patent
Johnson

(10) Patent No.: US 8,985,697 B2
(45) Date of Patent: Mar. 24, 2015

(54) STRAP RESTRAINING SYSTEM FOR CHILD CARE DEVICES

(76) Inventor: Kelli M. Johnson, Cottonwood Heights, UT (US)

( * ) Notice: Subject to any disclaimer, the term of this patent is extended or adjusted under 35 U.S.C. 154(b) by 107 days.

(21) Appl. No.: 13/465,594

(22) Filed: May 7, 2012

(65) Prior Publication Data

US 2012/0284968 A1 Nov. 15, 2012

Related U.S. Application Data

(60) Provisional application No. 61/484,014, filed on May 9, 2011.

(51) Int. Cl.
*B60R 22/00* (2006.01)
*H01F 7/02* (2006.01)

(52) U.S. Cl.
CPC .................................... *H01F 7/0263* (2013.01)
USPC .......................................................... 297/481

(58) Field of Classification Search
USPC ........ 297/463.1, 463.2, 481, 482, 484, 250.1, 297/181, 483; 280/801.1, 808; 472/137
See application file for complete search history.

(56) References Cited

U.S. PATENT DOCUMENTS

| | | | | |
|---|---|---|---|---|
| 4,323,278 | A * | 4/1982 | Sukopp et al. | 297/481 X |
| 4,595,618 | A | 6/1986 | Caringer | |
| 4,759,588 | A * | 7/1988 | Husnik | 297/482 |
| 5,609,367 | A | 3/1997 | Eusebi et al. | |
| 6,305,745 | B1 * | 10/2001 | Rijsdijk | 297/250.1 |
| 6,523,901 | B2 * | 2/2003 | Smith | 297/392 |
| 7,104,570 | B2 | 9/2006 | Hearn et al. | |
| 7,387,315 | B2 | 6/2008 | Nett et al. | |
| 7,785,167 | B2 * | 8/2010 | Friend-Douglass | 297/181 |
| 8,465,102 | B2 * | 6/2013 | Morrissey | 297/484 X |
| 2005/0067827 | A1 * | 3/2005 | Bostrom et al. | 280/801.1 X |
| 2005/0179289 | A1 | 8/2005 | Fuller et al. | |
| 2008/0211278 | A1 | 9/2008 | Macliver | |
| 2009/0077777 | A1 | 3/2009 | Horowitz | |
| 2011/0037302 | A1 | 2/2011 | Tharp | |
| 2012/0045597 | A1 | 2/2012 | Ponce | |

OTHER PUBLICATIONS

Buckle Pals Carseat Strap Holders, http://valuetownbaby.com/store/shop_product.php?UPC=13691, Accessed: Apr. 11, 2012.
Boso Buddies Strap, http://www.babydeals365.com/2498/boso-buddies-strap-holder-50-off-at-babyhalf-off/, Accessed: Apr. 11, 2012.
(Continued)

*Primary Examiner* — Anthony D Barfield
(74) *Attorney, Agent, or Firm* — Workman Nydegger

(57) ABSTRACT

Apparatus and systems for securing safety restraints of child care devices for the insertion or removal of a child from the child care devices. A strap restraint device for securing one or more straps of a child care device includes a body portion. The body portion is configured to secure one or more straps of the child care device when the straps are draped over the body portion. The strap restraint device also includes an attachment device, which comprises means for removably securing the body portion to the child care device.

14 Claims, 7 Drawing Sheets

(56) References Cited

OTHER PUBLICATIONS

Buckle-Pals—Cling 'N Go Seatbelt Strap Holders, http://www.walmart.com/ip/Buckle-Pals-Cling-N-Go-Seatbelt-Strap-Holders/10660981, Accessed: Apr. 11, 2012.

Maxi-Cosi Priori Convertible Car Seat, http://www.strollerdepot.com/products.php?id=maxi-cosi-priori-convertiblecarseat&viewcap=Harness%20Holders%20on%20car%20seat%20help%20make%20it%20easy%20to%20strap%20your%20child%20in&viewimg=0075.g.jpg&SKU=0075, Accessed: Apr. 11, 2012.

* cited by examiner

STRAP RESTRAINING SYSTEM FOR CHILD CARE DEVICES

CROSS-REFERENCE TO RELATED APPLICATIONS

This application is a non-provisional of, and claims priority to and the benefit of, U.S. Patent Application Ser. No. 61/484,014 filed on May 9, 2011, entitled "CAR SEAT STRAP RESTRAINING SYSTEM," which application is hereby expressly incorporated herein by this reference in its entirety.

BACKGROUND OF THE INVENTION

1. The Field of the Invention

The present invention generally relates to the field of securing safety restraints on child care devices.

2. The Relevant Technology

Child care devices (e.g., car seats, strollers, carriers, boosters, bouncers, swings, etc.) have become popular for transporting and entertaining children. Child care devices typically incorporate safety restraint mechanisms (e.g., harnesses, straps, etc.) that are configured to secure children within the devices. While safety restraints are integral to protecting children during the use of child care devices, safety restraints present several drawbacks. For example, safety restraints often impede the insertion of children into (and the removal of children from) child care devices. As such, safety restraints can cause discomfort for children and inconvenience for caregivers. Moreover, many safety restraints that are employed by child care devices incorporate rigid members (e.g., fasteners, buckles, etc.) that, when misaligned, have the potential to injure children during insertion into and/or removal from child care devices.

One problem with existing systems, for example, is that safety restraints (e.g., straps) have a tendency to fall towards the center of child care devices—where the child is typically positioned—due in part to the effects of gravity on the safety restraints and on any attached members (e.g., fasteners, buckles, etc.). For example, FIG. 1 illustrates a child's car seat (and carrier) that includes straps and buckles for restraining a child during use of the car seat. As depicted, when no child is in the car seat, the straps and buckles naturally fall within the center region of the car seat. The straps and buckles, therefore, often get in the way of a child being properly inserted into the car seat.

While holding the child in one hand, a caregiver may use his or her other hand to move the straps and buckles out the way, and then carefully and quickly insert the child into the car seat (i.e., between the straps and buckles) before the straps and buckles are able to fall back into the center region of the car seat. However, the straps and buckles often fall back into the center region of the car seat before the caregiver is able to fully insert the child. As such, the caregiver must again move the straps and buckles, this time out from underneath the child, before finally fastening the child into the car seat.

This process can be extremely difficult and inconvenient for the caregiver—particularly when the child is being uncooperative—and can cause significant discomfort for the child. Furthermore, because buckles (or any other type of fastening device) may have abrupt edges and are typically hard (often being made of metal and/or hard plastics) buckles may even cause injury to the child. In either case, the foregoing process can involve an undesired amount of time and can often upset the child, which further complicates use of existing child care devices.

Likewise, when removing the child from the car seat, the straps and buckles can also be problematic. For instance, after unfastening the straps and buckles from the child and attempting to remove the child from the car seat, it is not uncommon for a child's arm or leg to get caught within the straps and buckles that remain resting on the child after they are unfastened. This can cause additional inconvenience, discomfort, and the possibility of injury.

BRIEF SUMMARY OF THE INVENTION

The present invention extends to apparatus and systems for securing straps or other safety restraints of child care devices, such as car seats, strollers, bouncers, etc. In particular, the present invention extends to apparatus and systems that are configured to provide a resting object comprising a protrusion from the child care device and onto which a caregiver can temporarily loosely drape straps or other safety restraints while inserting a child into (or removing the child from) the child care device. As such, embodiments of the present invention provide a quick and convenient mechanism for holding safety restraints out of the way when using child care devices.

One embodiment of a strap restraint device for securing one or more straps of a child care device includes a body portion that is configured to restrain or secure one or more straps of the child care device when the straps are draped over the body portion. The body portion also includes one or more features for providing sensory stimulus to a child. The strap restraint device also includes an attachment device, which comprises means for removably securing the body portion to the child care device.

In another embodiment, the strap restraint device includes a body portion, which is configured to secure one or more straps of the child care device when the one or more straps are loosely positioned around the body portion. The strap restraint device also includes a first attachment portion that is configured to affix to the child care device. The first attachment portion includes one or more first fastening mechanisms that are configured to removably secure to one or more second fastening mechanisms. The strap restraint device also includes a second attachment portion that is affixed to the body portion. The second attachment portion includes the one or more second fastening mechanisms.

In yet another embodiment, the strap restraint system includes a first strap restraint device, which is configured to temporarily restrain one or more first straps of the child care device to a first side of the child care device. The first strap restraint device includes a first body that comprises one or more features for providing sensory stimulus to a child and that is configured to temporarily restrain the one or more first straps to the first side of the child care device when the one or more first straps are draped around the first body. The first strap restraint device also includes a first fastening mechanism, which includes a first corresponding portion that is configured to affix to the first body and a second corresponding portion that is configured to affix to the first side of the child care device. The first corresponding portion and the second corresponding portion of the first fastening mechanism are configured to removably affix to one another.

The exemplary strap restraint system also includes a second strap restraint device, which is configured to temporarily restrain one or more second straps of the child care device to a second side of the child care device. The second strap restraint device includes a second body that comprises one or more features for providing sensory stimulus to the child and that is configured to temporarily restrain the one or more second straps to the second side of the child care device when the one or more second straps are draped around the second body. The second strap restraint device also includes a second fastening mechanism, which includes a first corresponding portion that is configured to affix to the second body and a second corresponding portion that is configured to affix to the second side of the child care device. The first corresponding portion and the second corresponding portion of the second fastening mechanism are configured to removably affix to one another.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The present invention extends to apparatus and systems for securing straps or other safety restraints of child care devices, such as car seats, strollers, bouncers, etc. In particular, the present invention extends to apparatus and systems that are configured to provide a protrusion onto which a caregiver can temporarily loosely drape straps or other safety restraints while inserting a child into (or removing the child from) a child care device. As such, embodiments of the present invention can provide a quick and convenient mechanism for holding safety restraints out of the way when using child care devices and that can also be used to distract and/or entertain a child.

The embodiments disclosed herein therefore can alleviate or even eliminate the discomfort and inconvenience caused to children and/or caregivers as children are inserted into or removed from a child care device containing safety restraints. Furthermore, embodiments disclosed herein can reduce the contact that children have with safety restraints during insertion into and removal from child care devices. Since safety restraints often include potentially dangerous fastening members (e.g., buckles, zippers, buttons, clips), the embodiments described herein can greatly diminish the possibility of causing injury to the child during use of child care devices.

Embodiments of the invention are described and illustrated herein primarily in connection with a child car seat and carrier. It will be appreciated, however, that embodiments of the invention can be applied to any device that incorporates safety restraints (straps, harnesses, etc.), whether in the context of child care devices or other devices.

One or more embodiments of the present invention provide one or more restraining devices for temporarily securing, holding or otherwise displacing safety restraints (e.g., straps, harnesses), including any fastening members (e.g., buckles, zippers, buttons, clips), of child care devices while inserting a child into or removing a child from the child care devices.

Figure 2:
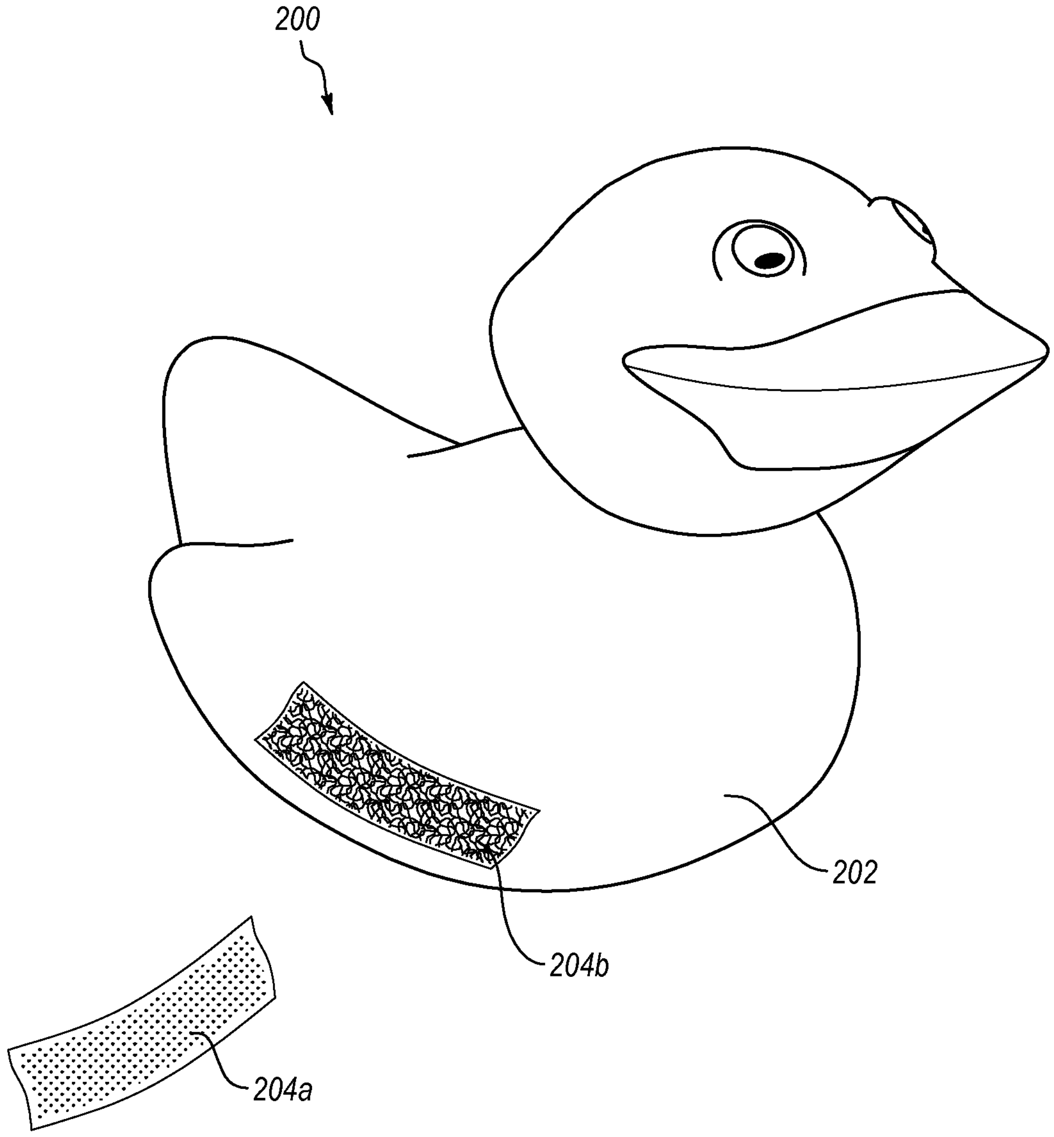
FIG. 2 illustrates a strap restraint device according to one or more embodiments of the invention.

FIG. 2, for example, illustrates an exemplary strap restraint device 200. As depicted, strap restraint device 200 includes a body portion 202 and an attachment device 204 (which includes 204*a* and 204*b*). Strap restraint device 200 is configured to attach to a child care device and to provide a platform or surface over which one or more restraints (e.g., straps) of the child care device can be temporarily draped. As such, strap restraint device 200 prevents the restraints of the child care device from falling into the center area of the child care device while a caregiver inserts a child into, or removes the child from, the child care device.

Figure 1:
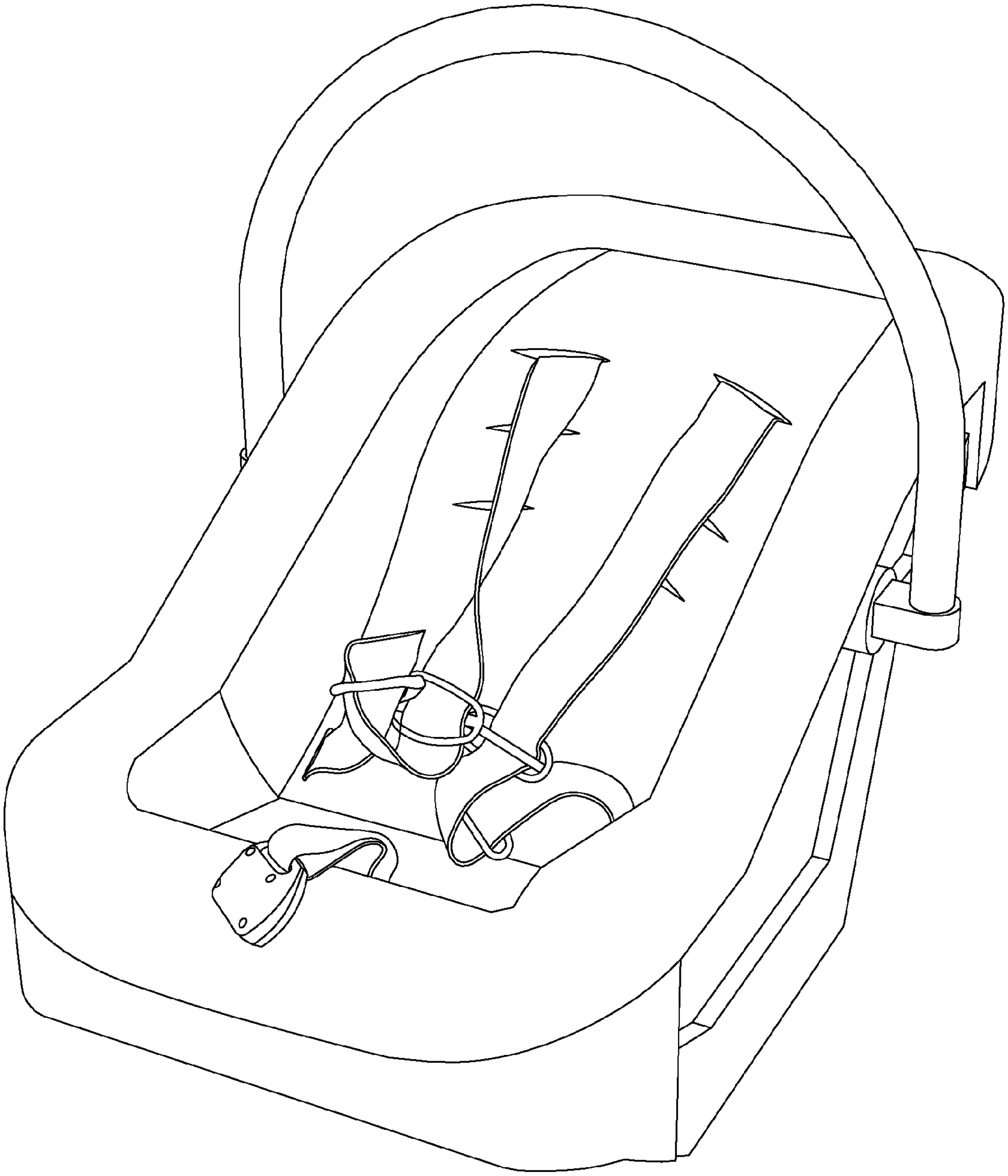
FIG. 1 (Prior Art)
FIG. 1 illustrates a child's car seat and carrier that includes straps and buckles for restraining a child during use of the car seat.
Figure 3:
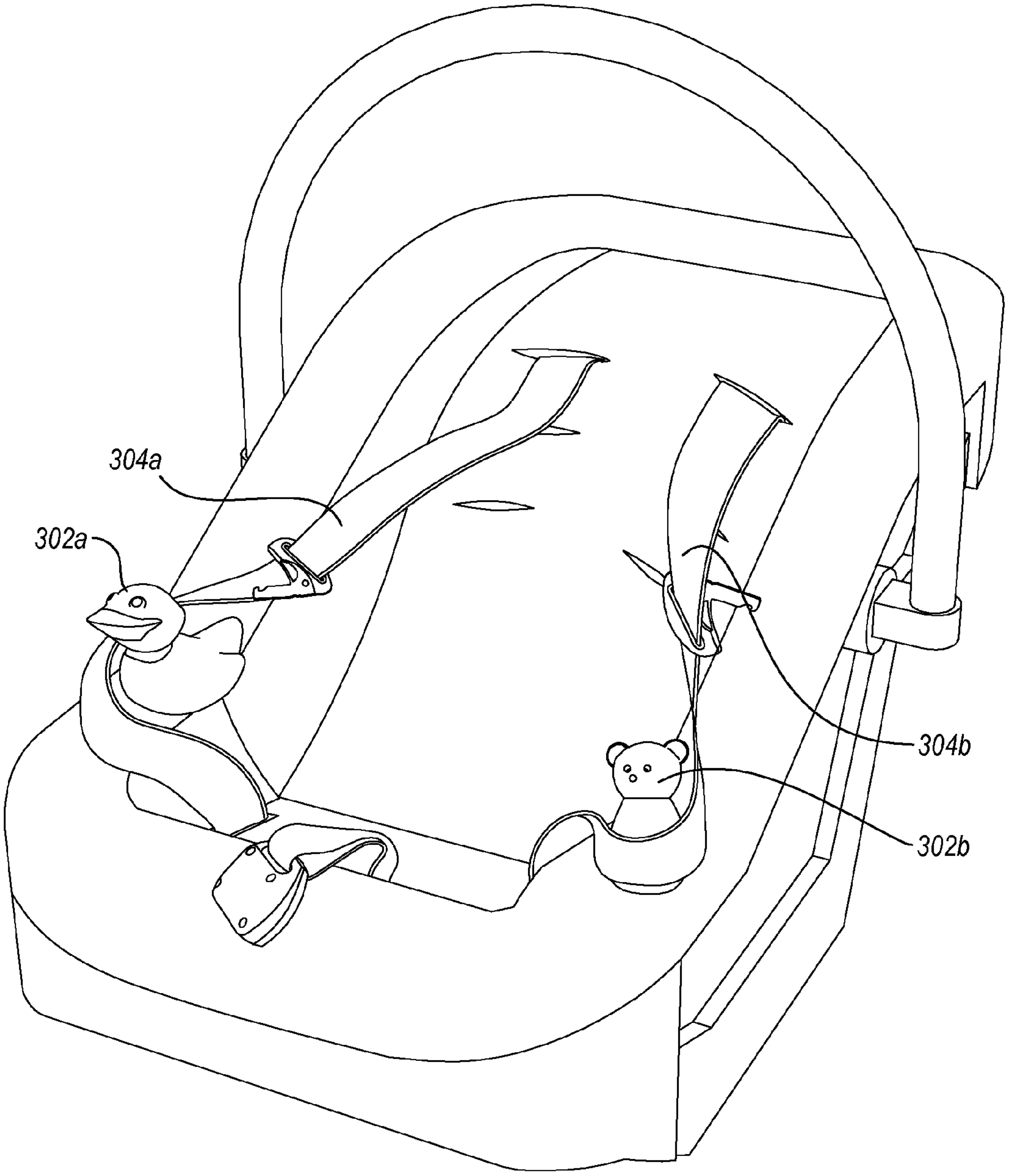
FIG. 3 illustrates a car seat that includes two strap restraint devices according to one or more embodiments of the invention.

Turning briefly to FIG. 3, FIG. 3 illustrates the car seat of FIG. 1, but includes two strap restraint devices 302*a* and 302*b* that have been attached to either side of the car seat. As depicted, the first strap restraint device 302*a* is attached to a first side of the car seat and secures a first strap 304*a*. Similarly, the second strap restraint device 302*b* is attached to a second side of the car seat and secures a second strap 304*b*. As depicted, straps 304*a* and 304*b* drape around the strap restraint devices 302*a*, 302*b* so that they rest loosely around restraint devices 302*a* and 302*b*, respectively.

To position straps 304*a*, 304*b* into the position depicted in FIG. 3, a caregiver may use a single hand to lift each strap 304*a*, 304*b* up and over the corresponding strap restraint devices 302*a* and 302*b*. Similarly, the caregiver may use a single hand to remove straps 304*a*, 304*b* from strap restraint devices 302*a* and 302*b*. Of course, the caregiver may use both hands to position straps 304*a* and 304*b*, if desired, but the caregiver might use a single hand to manipulate the strap when the caregiver is holding a child with the other hand.

It is noted that, once secured to the child care device, strap restraint devices 302*a* and 302*b* restrain straps 304*a* and 304*b* without the need to feed, thread or otherwise position straps 304*a* and 304*b* through any portion of strap restraint devices 302*a* and 302*b*. This can also be done without having to further manipulate any portion of strap restraint devices 302*a* and 302*b*. Instead, the caregiver can simply and position straps 304*a* and 304*b* with a simple and straightforward repositioning of straps 304*a* and 304*b* loosely over strap restraint devices 302*a* and 302*b*.

Notably, the current invention provides improvements over prior art systems which require a degree of manual dexterity and manipulation of the operative restraining devices to effectively tie down or affix the straps into a desired displacement. The improvements of the invention are particularly noticeable when realizing the ease with which the straps can simply be looped up an over the inventive restraint devices to connect the buckles of the straps or to otherwise secure the straps around a child after the child is placed in the device. In contrast, prior art systems often require the user to perform several steps to loosen or unsecure the straps from the restraint devices before the straps can be used to secure the child.

The inventive restraint devices are also configured to be interchangeable to accommodate many different needs and preferences in different circumstances and at different times. Other prior art systems fail to provide this type of interchangeability and functionality.

According to some embodiments, a plurality of different restraint devices having different configurations are provided with and/or packaged with the seat or other child care devices at the point of sale, to thereby provide for the aforementioned interchangeability. In some embodiments, different restraint devices are provided individually or in kits that package one or more types of different restraint devices together. The scope of the invention, therefore, extends not only to the restraint devices, but also to products that incorporate or utilize one or more of the restraint devices. In fact, the scope of the invention also extends to child care devices that are configured with attachment devices (described below) or any portion of the attachment devices described herein.

Returning to FIG. 2, body portion 202 of strap restraint device 200 may comprise virtually any combination of shape(s) and material(s). In some embodiments, body portion 202 comprises a shape and material that is configured to increase friction between body portion 202 and restraints of the child care device. For example, body portion 202 may comprise a soft/fuzzy material (e.g., felt, plush, etc.) and a generally spherical shape, which can enhance the frictional coefficient between restraints and the body portion 202 more effectively than would occur with some other shapes and some other materials. However, any shape can be used, including cubes or other rectangular type shapes, balls or other spherical or rounded shapes, conical shapes, prism shapes, animal shapes, toy shapes and/or any combination of these or other shapes. The sizes of the shapes can also vary from small objects having a diameter of less than one inch to objects having a diameter of greater than three inches. However, in many instances, the body portion 202 will have a diameter that falls roughly within the range of about one inch to about three inches. It will also be appreciated that the body portion 202 can be hollow or solid and have different weights and densities.

In some embodiments, body portion 202 comprises a shape and material that is configured to hold the interest of, to educate, or to otherwise entertain a child that is positioned in the child care device. As such, body portion 202 can include decorations, toys, or any other item that would provide tactile, visual, audible, or any other sensory stimulus to a child. For example, body portion 202 can take the form of a figurine, a ball, a car, etc. In some embodiments, body portion 202 takes a plush form (e.g., a stuffed animal or figurine such as the depicted duck), which provides both sensory stimuli to a child and a high fictional coefficient against a restraint device. Body portion 202 can include any other components as well, which may be designed to provide additional sensory stimuli, such as bells, pictures, speakers, lights, and the like. In some embodiments, the body portion includes sensors that detect motion, touch or other interaction so as to responsively provide the additional sensory stimuli.

As indicated above, body portion 202 can comprise many different shape/material combinations. Keeping with the context of child safety devices, for example, body portion 202 can comprise objects that provide additional functional utility, such as containers (e.g., to hold snacks, to hold cleaning wipes, etc.), entertainment devices (e.g., music devices, games, puzzles, mirrors, etc.), lighting devices, baby monitoring devices, identification devices, tracking devices, medical devices, etc.

Attachment device 204 (shown in FIG. 2 as comprising elements 204*a* and 204*b*) can include any appropriate means for securing body portion 202 to a child care device. In some embodiments, attachment device 204 comprises means for removably securing or detachably connecting body portion 202 to a child care device. When body portion 202 is detachably connected to the child care device, body portion 202 can be easily cleaned, can be used on a plurality child care devices, and can serve other functions when not being used to secure restraints of the child care device. For example, if body portion 202 comprises a toy or other item that would provide sensory stimulus to a child, body portion 202 can be selectively removed so that the child can play with and be entertained by body portion 202 while the child uses the child care device.

Within the context of means for removably securing body portion 202 to a child care device, attachment device 204 may comprise hook and loop fasteners (e.g., Velcro®), buttons, zippers, snaps, ribbons/knots, magnets, clamps, clasps, and like. For example, FIG. 2 illustrates attachment device 204 as comprising a hook and loop fastener. As depicted, one half of the fastener can form a first attachment portion 204*a* that is can be affixed to the child care device, and the other half of the fastener can form a second attachment portion 204*b* that is affixed to body portion 202. As such, first attachment portion 204*a* and second attachment portion 204*b* are usable to removably connect body portion 202 to child care devices.

Figure 4A:
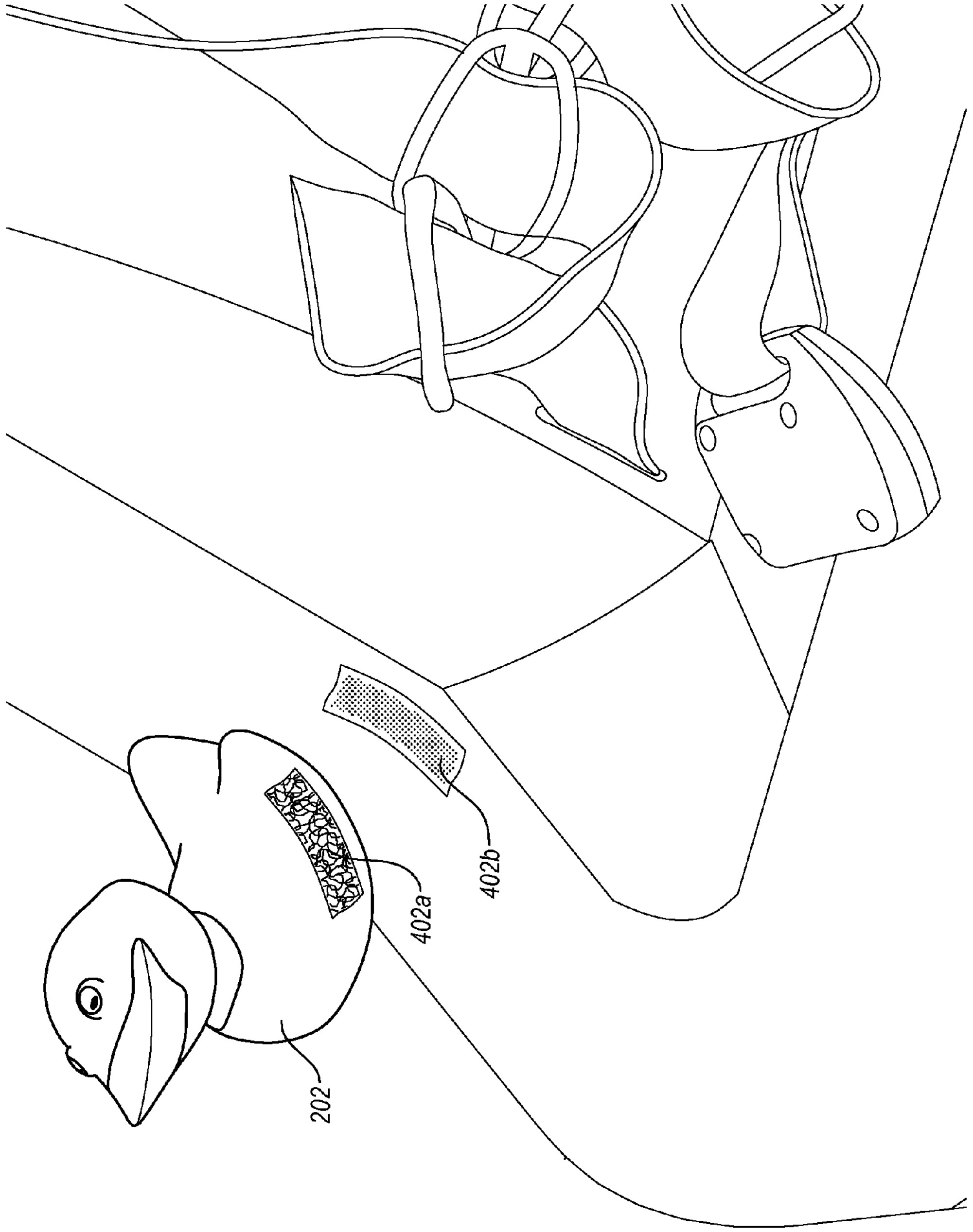
FIG. 4A illustrates an attachment device, according to one or more embodiments of the invention, that comprises a hook and loop fastener.

FIGS. 4A-4D illustrate some other non-limiting examples of different configurations of attachment device 204, in which attachment device 204 is configured to provide means for removably securing body portion 202 to a child care device. FIG. 4A, for example, again illustrates that attachment device 204 can comprise a hook and loop fastener. In FIG. 4A, a first attachment portion 402*a* is depicted as being attached to the child care device, and a second attachment portion 402*b* is depicted as being attached to body portion 202. When using a hook and loop fastener, the different halves of the fastener can be attached to the body portion and the child care device using temporary and/or permanent attachment means. For example, the different halves of the fastener can be attached using adhesive, stitching, and so forth.

Figure 4B:
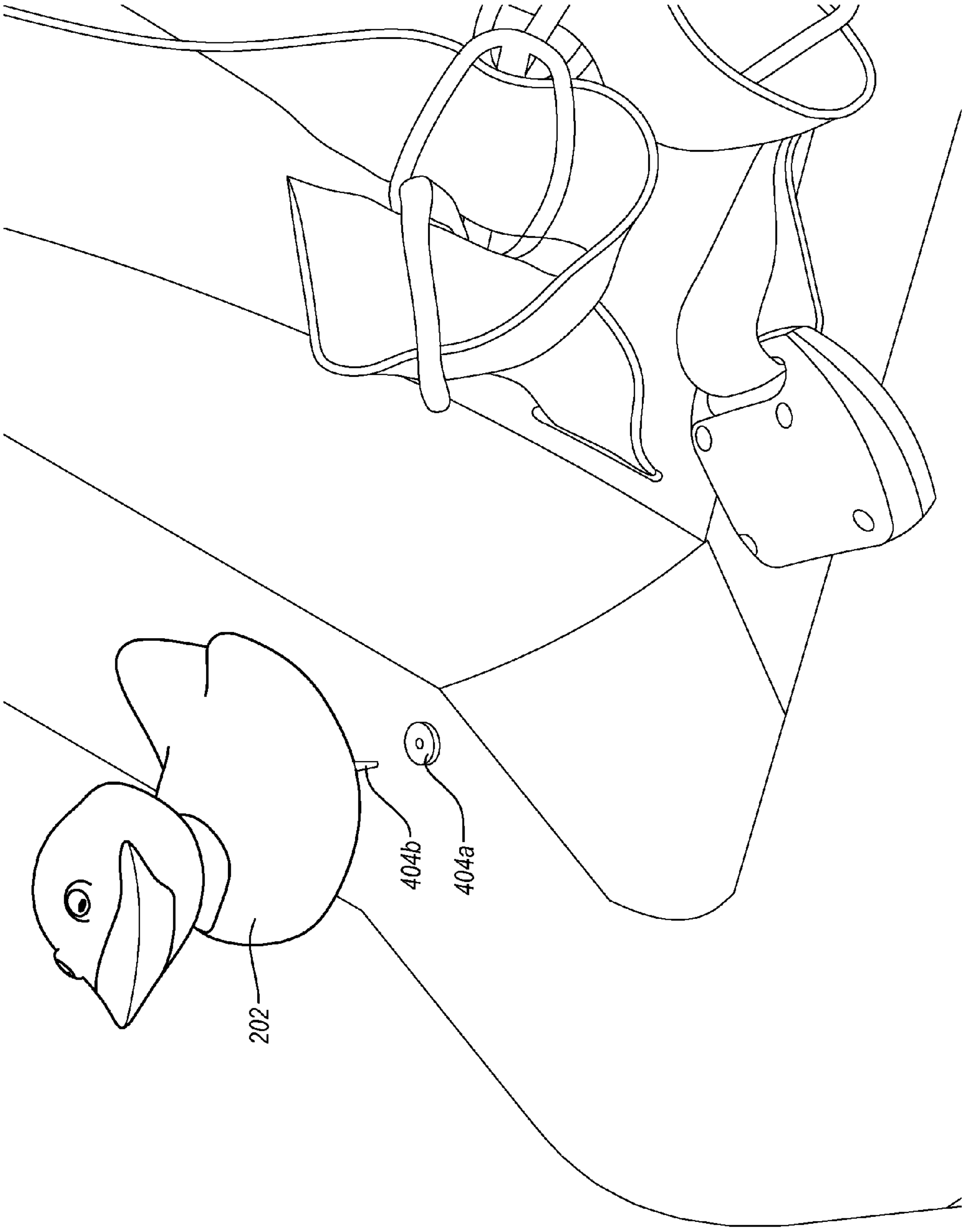
FIG. 4B illustrates an attachment device, according to one or more embodiments of the invention, which comprises a clutch and pin style fastener.

FIG. 4B illustrates that attachment device 204 can comprise a clutch and pin style fastener. For example, FIG. 4B illustrates that a first portion 404*a* of the fastener can be mounted (temporarily or permanently) to the child care device. For example, the clutch portion of the fastener may be incorporated into the child care device, or may be otherwise attached to the child care device. FIG. 4B also illustrates that a second portion 404*b* of the fastener can be attached to body portion 202. For example, the "pin" of the fastener may be incorporated into or attached to body portion 202. Of course, this configuration could also be reversed and the "pin" could be attached to the child care device while the clutch is attached to body portion 202. As such, a caregiver is enabled to temporarily attach body portion 202 to the child care device by inserting the second portion 404*b* into first portion 404*a*. One will appreciate that, while clutch and pin fasteners typically comprise pins having sharp points for piercing fabric during use, the fasteners in connection with the present invention may comprise blunt points to ensure child safety.

Figure 4C:
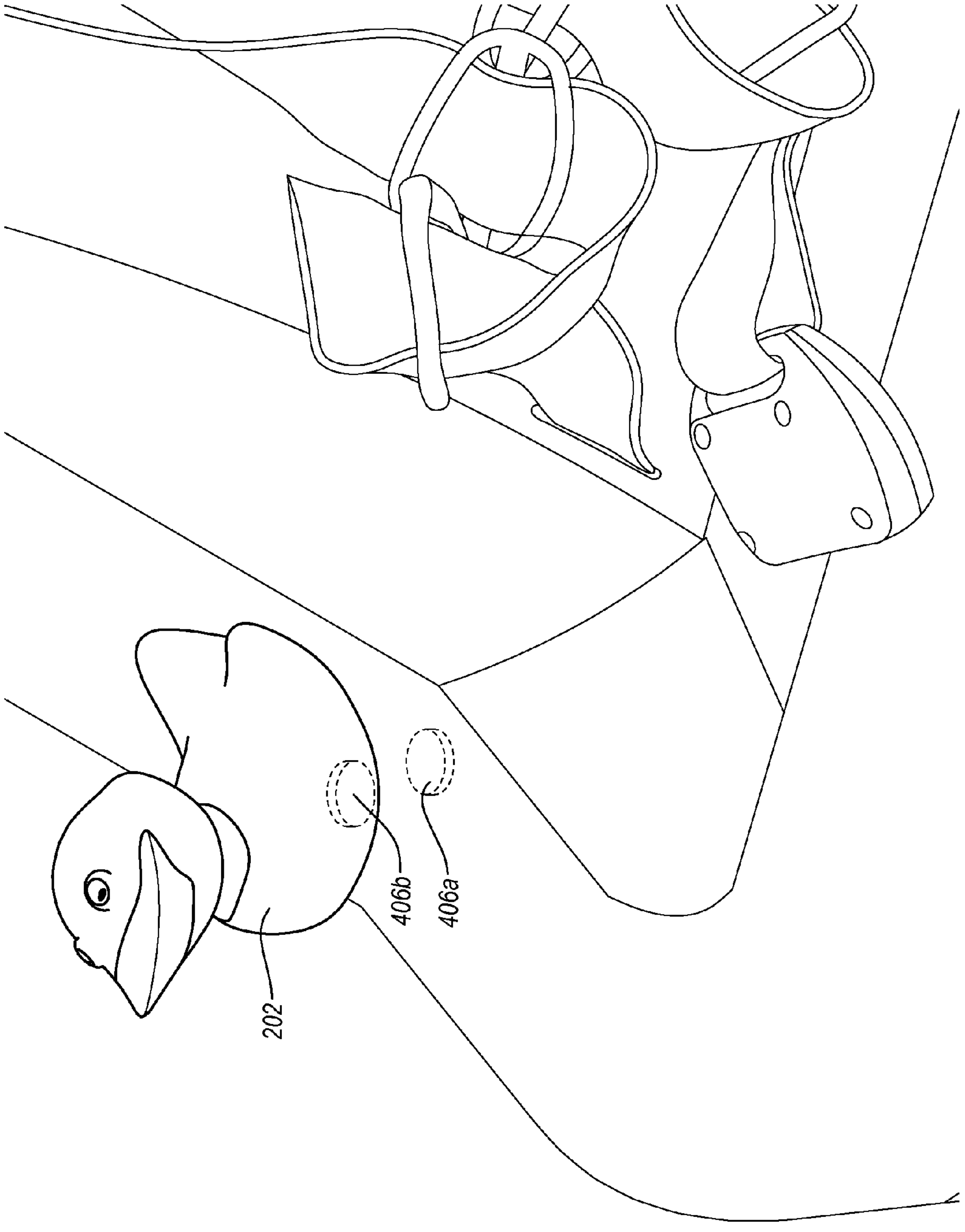
FIG. 4C illustrates an attachment device, according to one or more embodiments of the invention, which comprises magnets and/or ferromagnetic materials.

FIG. 4C illustrates that attachment device 204 can comprise one or more magnets and/or one or more ferromagnetic materials. As depicted, for example, a first magnet or ferromagnetic object 406*a* may be integrated into or attached to the child care device, and a second magnet or ferromagnetic object 406*b* may be integrated into or attached to body portion 202. These components can be configured to magnetically attract. For example a magnet in body portion 202 could be configured to attract a ferromagnetic material in the child care device (or vice versa), or a magnet in body portion 202 could be configured to attract another magnet in the child care device. Thus, body portion 202 can be attached to the child care device by bringing the first magnet or ferromagnetic object 406*a* and the second magnet or ferromagnetic object 406*b* near one another.

Figure 4D:
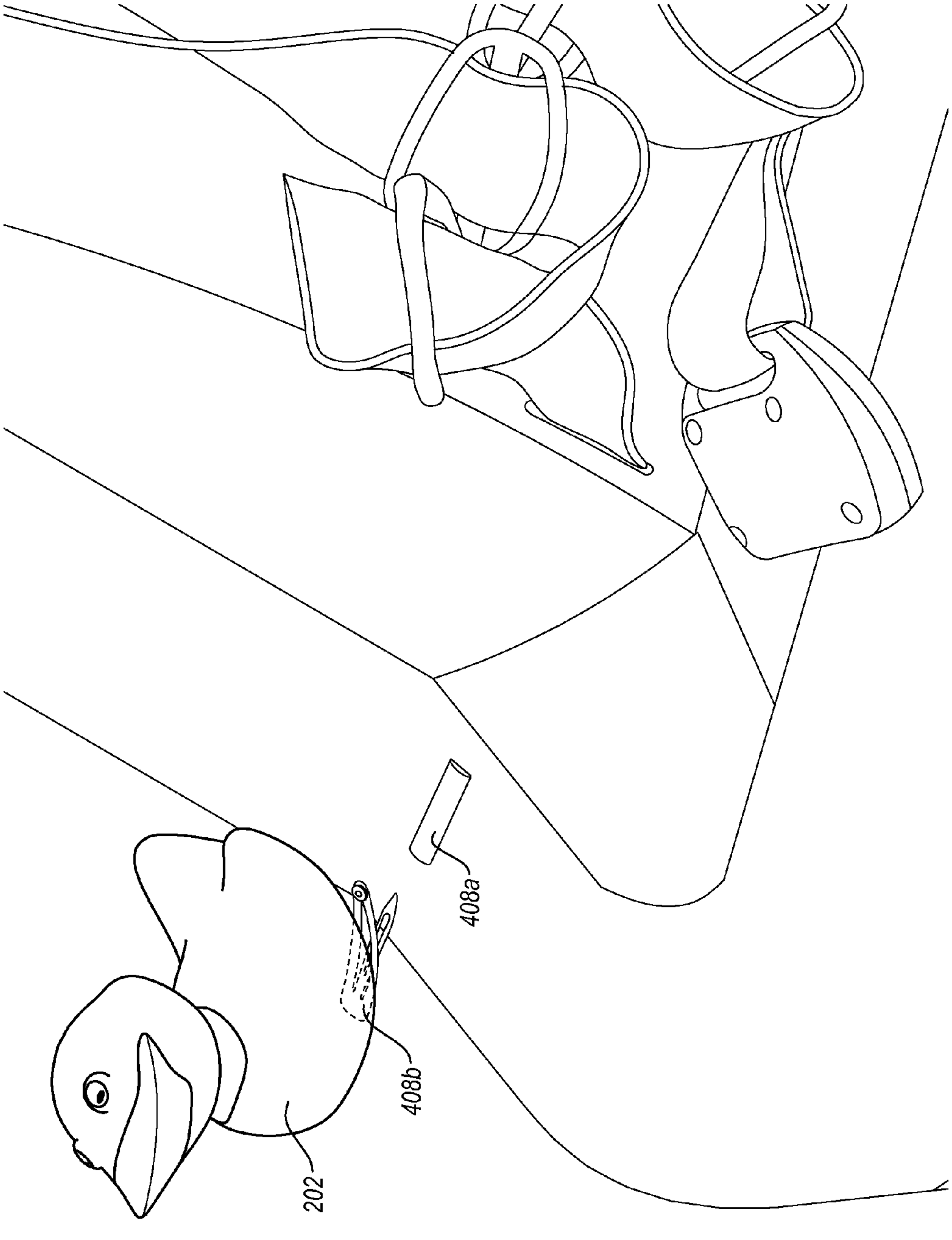
FIG. 4D illustrates an attachment device, according to one or more embodiments of the invention, which comprises a clasp-style fastener.

FIG. 4D illustrates that attachment device 204 can comprise one or more clasp-style fasteners, such as a barrette or similar device. Unlike the previous embodiments, in which attachment device 204 is comprised of separate components, a barrette can be used to make an attachment device 204 comprising a single component that attaches to existing structures of the child care device. As depicted, for example, the child care device can include a fold, pocket, or crease 408*b* in fabric from which the child care device is constructed. As such, barrette 408*a* that is attached to body portion 202 may be used to removably attach body portion 202 to the child care device by slipping barrette 408*a* through or over the fold, pocket, or crease 408*b*.

Other embodiments of attachment device 204 can comprise snap-style fasteners (not shown), such as a snap-style button that might be commonly found on a shirt. For example, a first part of a snap (e.g., "male" portion) may be attached to the child care device, and a second part of the snap (e.g., a "female" portion) may be attached to body portion 202 (or vice versa). Thus, when snapped together, the snap attaches body portion 202 to the child care device.

In some embodiments, attachment device 204 comprises means for permanently securing body portion 202 to a child care device. For example, means for permanently securing body portion 202 to a child care device may include stitching, gluing, riveting, screwing/bolting, and the like. In some embodiments, body portion 202 may be integral to the structure of the child care device itself, and can, for example, be molded into a frame or other structure of the child care device. In some embodiments, the body portion 202 is sewn into a fabric cover for the child care device.

As disclosed, embodiments of the invention can be used to improve safety, comfort, and convenience for manipulating safety restraints (e.g., harnesses or straps) of different child care devices. In particular, embodiments disclosed herein provide one or more restraint devices for securing harnesses or straps when a caregiver is inserting and/or removing a child from the child care device. While the foregoing description and Figures included a specific embodiment in the context of a child's car seat, one will appreciate that the embodiments described herein extend to any child care devices that incorporates safety restraints that may get in the way when inserting or removing a child from the child care device. Furthermore, embodiments can extend beyond the scope of child care devices entirely to include any context in which safety restraints (e.g., harnesses or straps) are used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A strap restraint system, the strap restraint system being configured to secure a plurality of straps of a child care device, the strap restraint system including:

the child care device, the child care device having a first and a second strap, each of the first and second straps being connected to the child care device at upper seat locations and lower seat locations;

a first strap restraint device that is configured to temporarily restrain the first strap of the child care device to a first side of the child care device, the first strap restraint device including:

a first body that comprises one or more features for providing sensory stimulus to a child and that is configured to temporarily restrain the first strap to the first side of the child care device when the first strap is draped around the first body and at a same time that the body portion of the first strap restraint device is attached to the child care device, and a first fastening mechanism that includes a first corresponding portion that is affixed to the first body and a second corresponding portion that is affixed to the first side of the child care device closer to the lower seat locations than to the upper seat locations, the first corresponding portion and the second corresponding portion of the first fastening mechanism being configured to removably affix to one another; and a second strap restraint device that is configured to temporarily restrain the second strap of the child care device to a second side of the child care device, the second strap restraint device including:

a second body that comprises one or more features for providing sensory stimulus to the child and that is configured to temporarily restrain the second strap to the second side of the child care device when the second strap is draped around the second body and at a same time that the body portion of the second strap restraint device is attached to the child care device, and a second fastening mechanism that includes a first corresponding portion that is affixed to the second body and a second corresponding portion that is affixed to the second side of the child care device closer to the lower seat locations than to the upper seat locations, the first corresponding portion and the second corresponding portion of the second fastening mechanism being configured to removably affix to one another.

2. The strap restraint system of claim 1, wherein the first fastening mechanism and the second fastening mechanism comprise one or more snap-style fasteners.

3. The strap restraint system of claim 1, wherein the first body comprises a diameter that is greater than about 1 inch.

4. The strap restraint system of claim 1, wherein at least one of first and second body includes one or more features for providing sensory stimulus to a child including a light emitting device.

5. The strap restraint system of claim 1, wherein at least one of first and second body includes one or more features for providing sensory stimulus to a child including a speaker.

6. The strap restraint device of claim 1, wherein the first fastening mechanism and the second fastening mechanism comprise magnets.

7. The strap restraint device of claim 1, wherein the first fastening mechanism and the second fastening mechanism comprise first and second portions of a clutch and pin fastener.

8. The strap restraint device of claim 1, wherein the first fastening mechanism and the second fastening mechanism comprise a first portion of a hook and loop fastener and a second portion of the hook and loop fastener.

9. The strap restraint system of claim 1, wherein the first corresponding portion of the first fastening mechanism and the second corresponding portion of the second fastening mechanism are each integrated into the child care device.

10. The strap restraint system of claim 1, wherein the first corresponding portion of the first fastening mechanism and the second corresponding portion of the second fastening mechanism are detachably affixed to the child care device.

11. The strap restraint system of claim 1, wherein at least one of the first fastening mechanism and the second fastening mechanism comprises a clamp.

12. The strap restrain system of claim 1, wherein the child care device comprises at least one of a baby car seat or carrier.

13. The strap restraint system of claim 1, wherein the upper seat locations include slots formed within a back rest portion of a car seat through which the first and second straps pass, respectively.

14. The strap restraint system of claim 1, wherein the lower seat locations include slots formed within a car seat through which the first and second straps pass, respectively.

* * * * *